June 18, 1957    E. A. LONGENECKER ET AL    2,796,143
AIR PURIFIER
Filed Aug. 8, 1952                         10 Sheets-Sheet 1
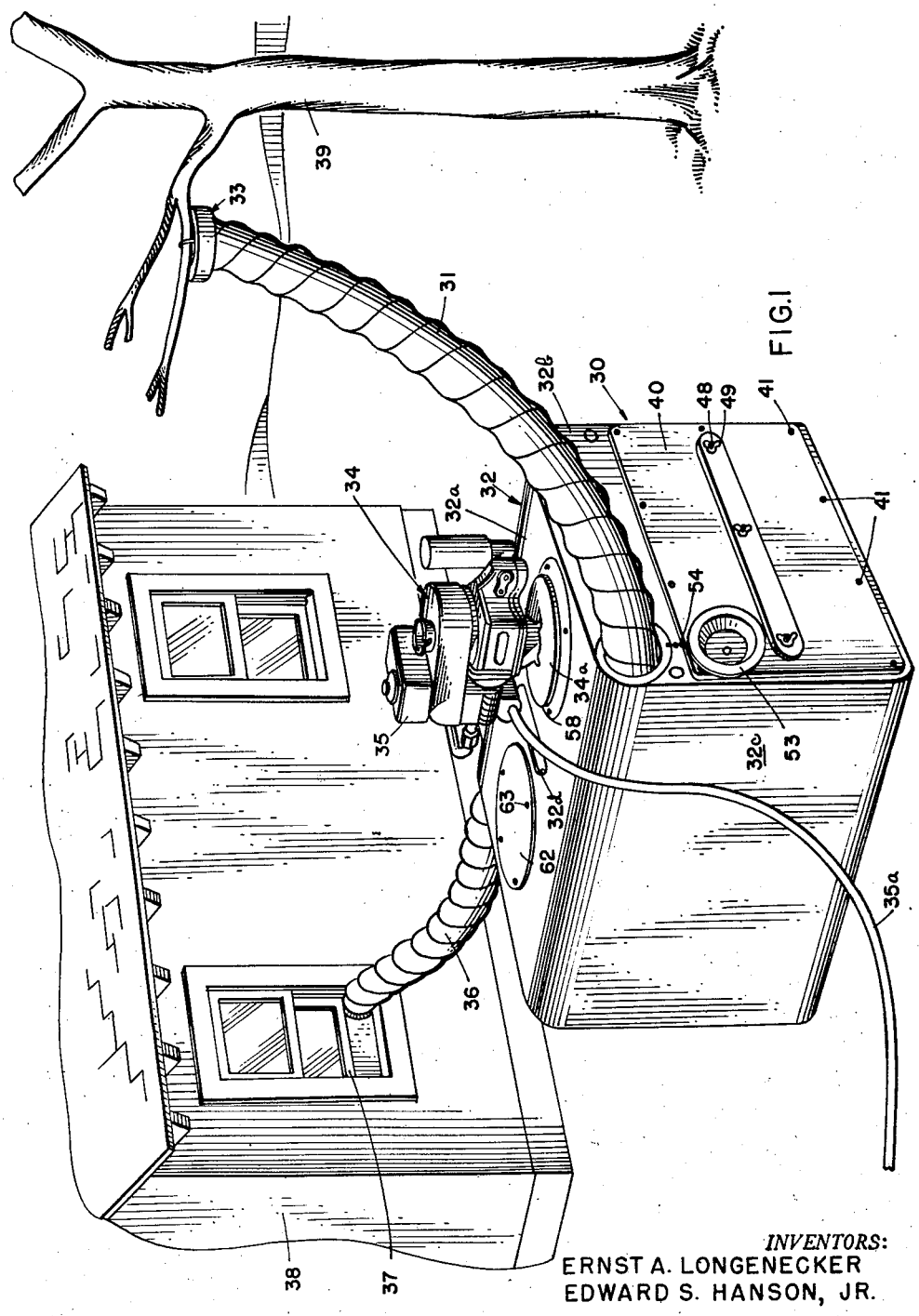
INVENTORS:
ERNST A. LONGENECKER
EDWARD S. HANSON, JR.
BY
ATT'YS

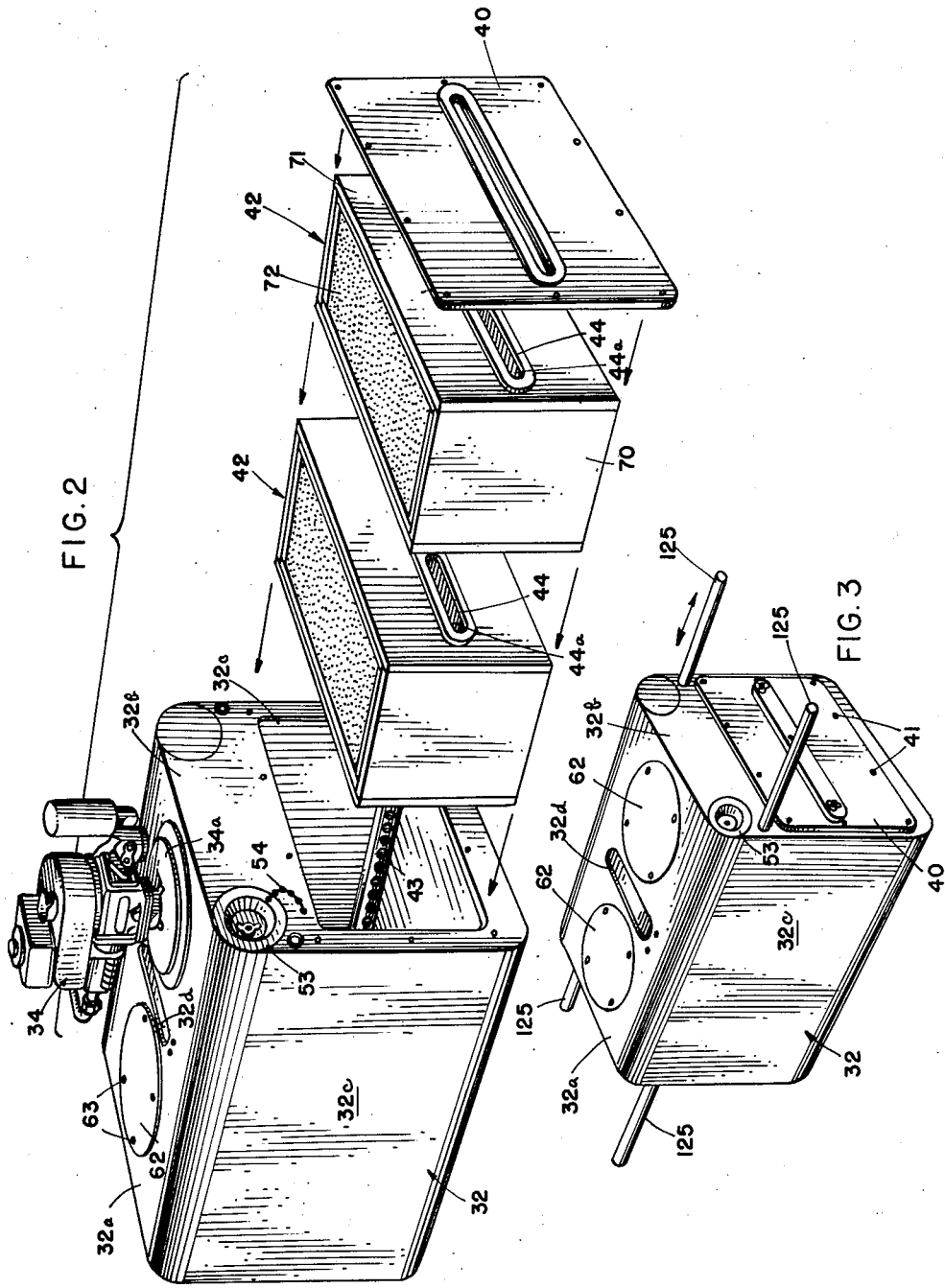

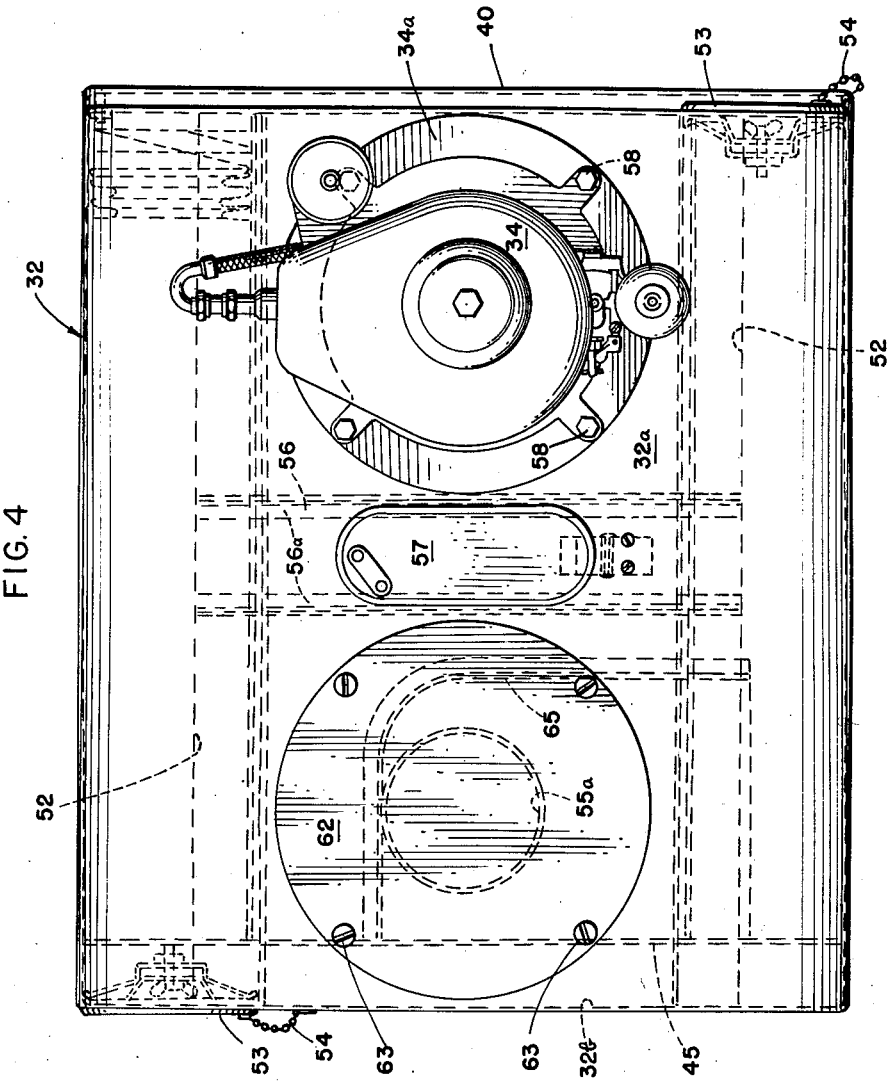

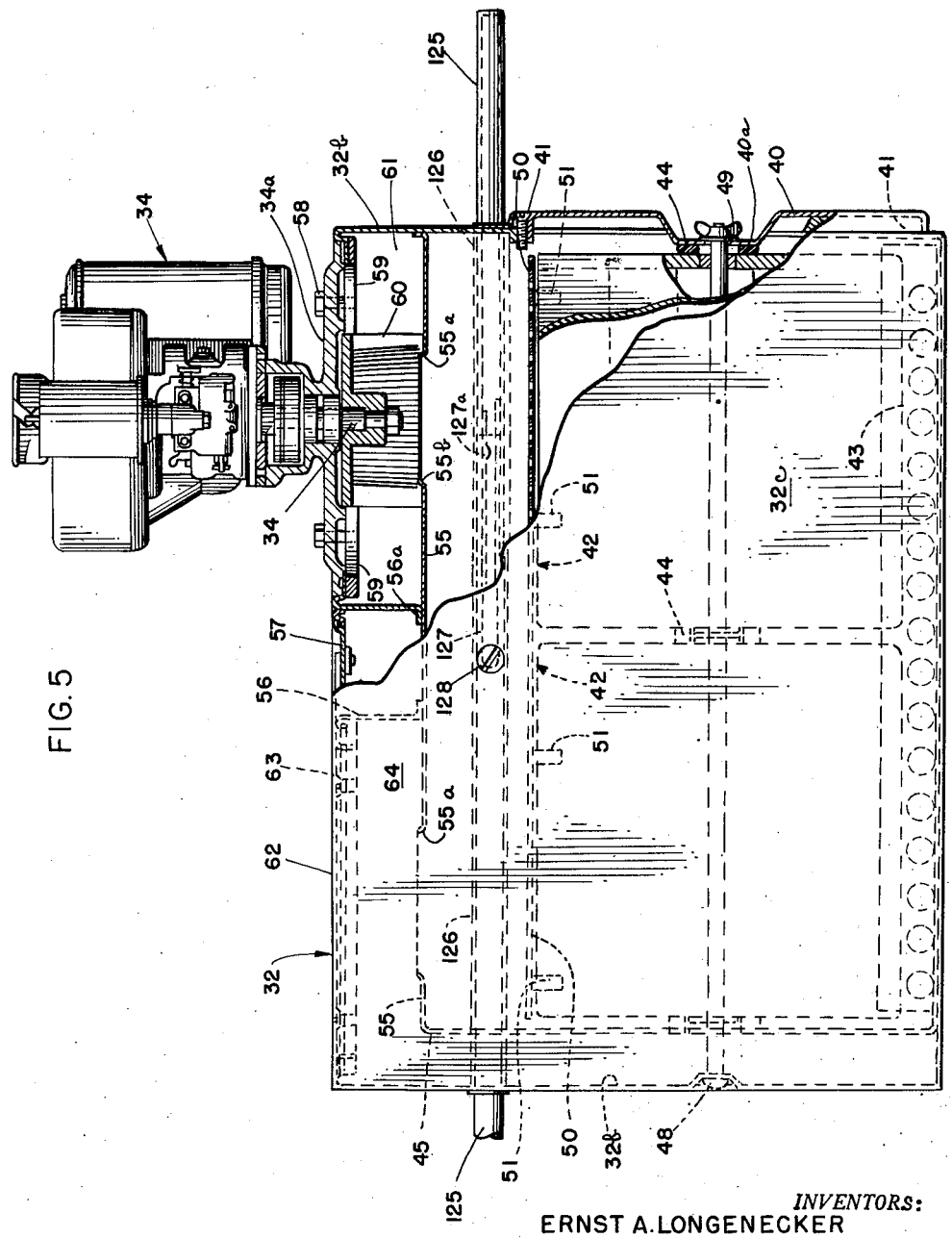

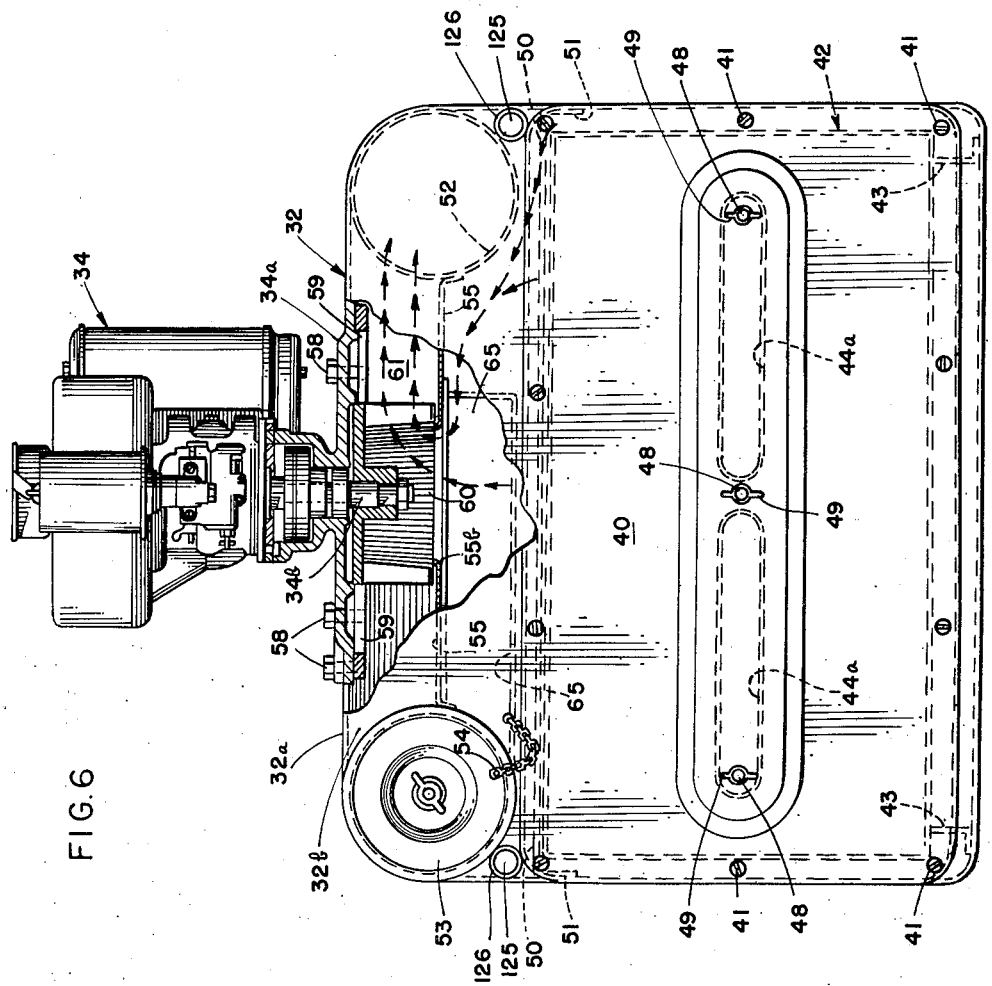

June 18, 1957 E. A. LONGENECKER ET AL 2,796,143
AIR PURIFIER
Filed Aug. 8, 1952 10 Sheets-Sheet 6
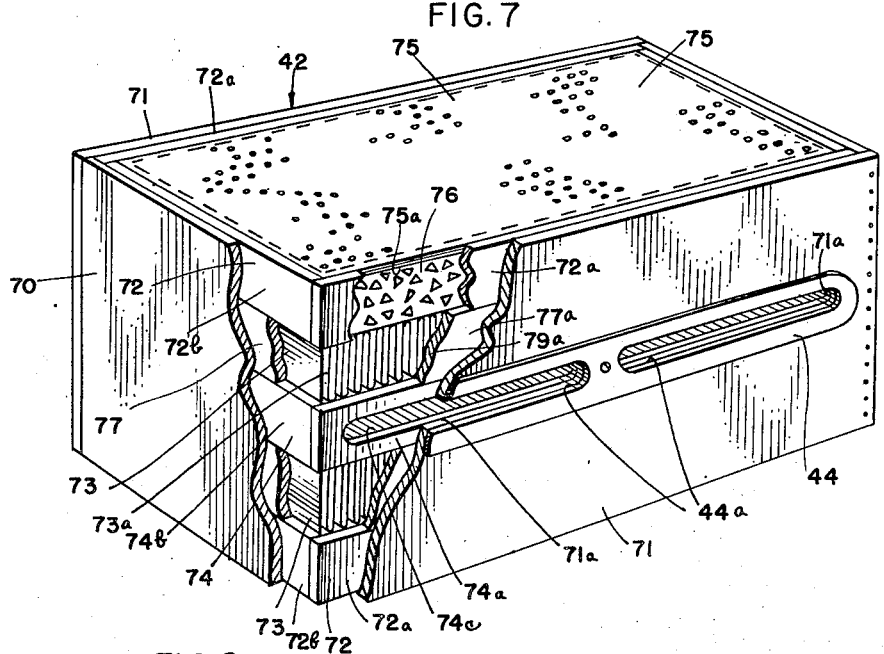
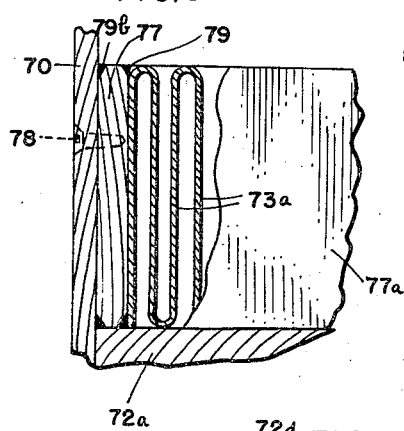
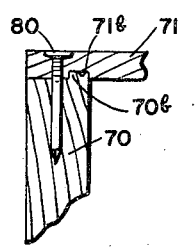
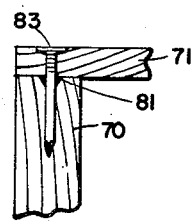
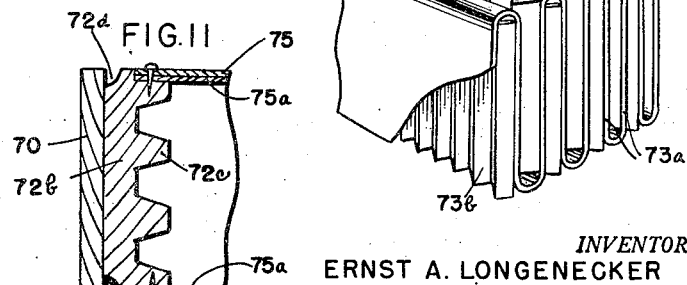
INVENTORS:
ERNST A. LONGENECKER
EDWARD S. HANSON, JR.
BY
ATT'YS

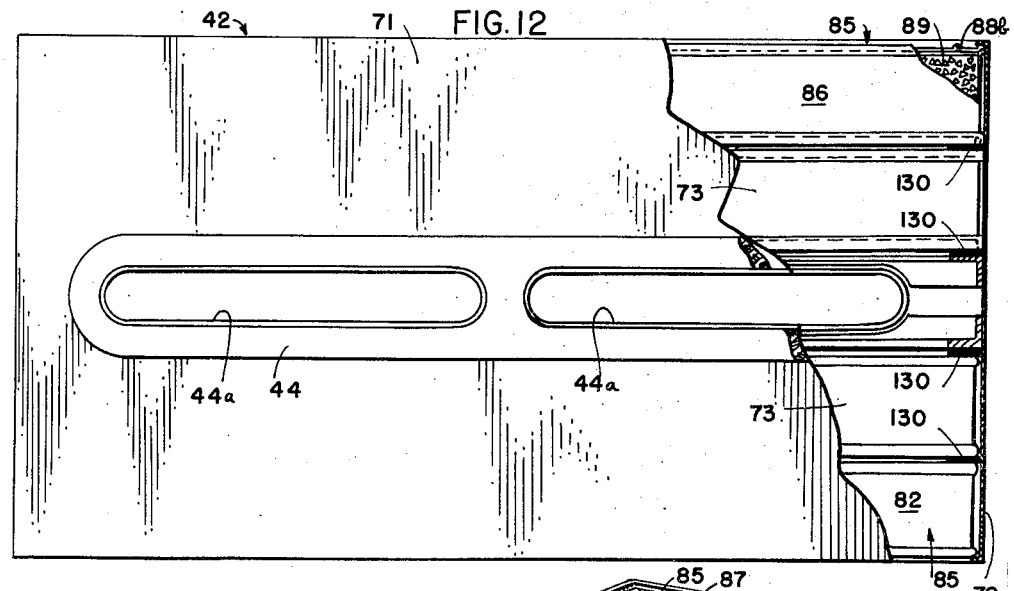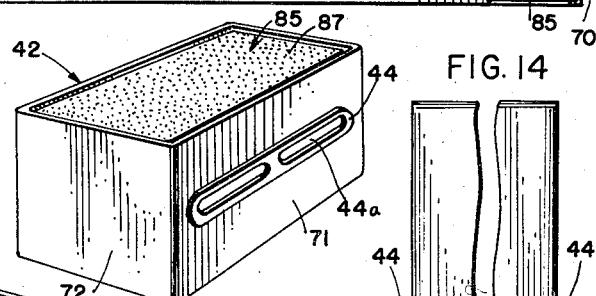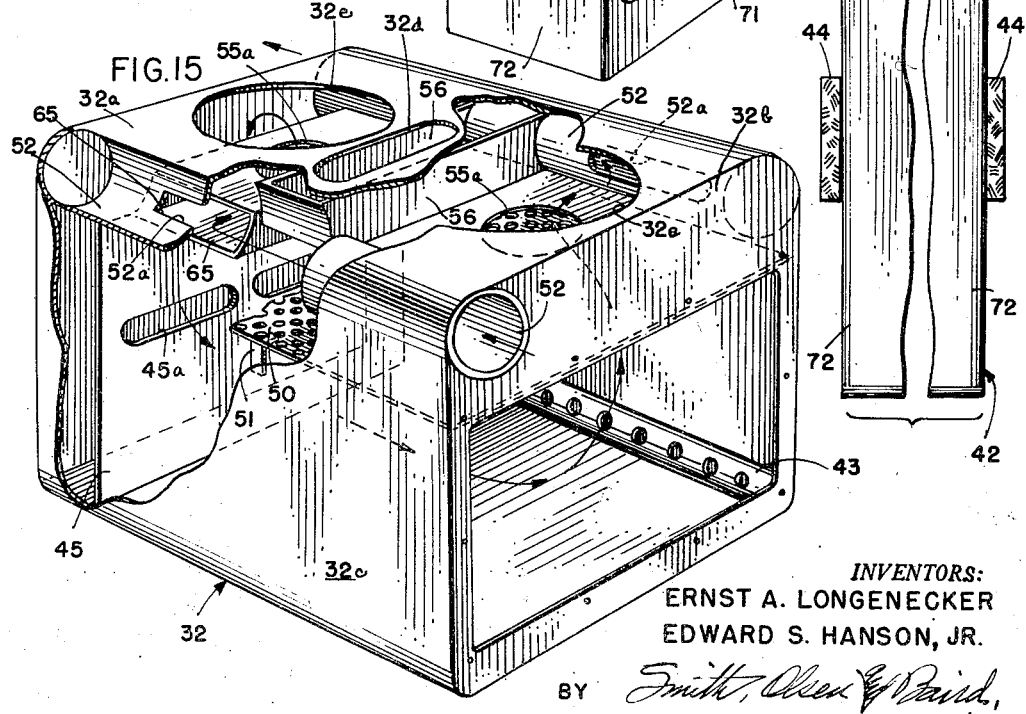

June 18, 1957  E. A. LONGENECKER ET AL  2,796,143
AIR PURIFIER
Filed Aug. 8, 1952  10 Sheets-Sheet 8
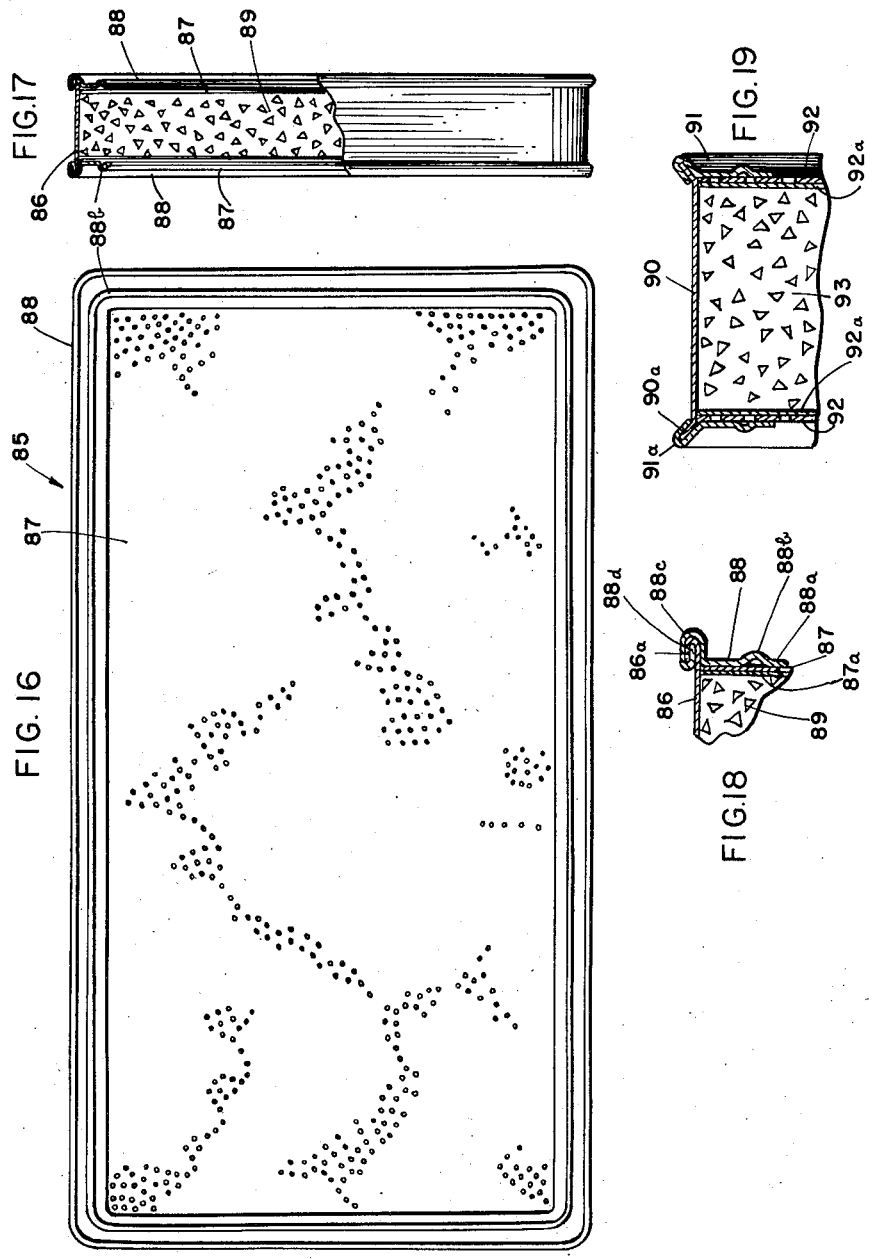
INVENTORS:
ERNST A. LONGENECKER
EDWARD S. HANSON, JR.
BY
ATT'YS

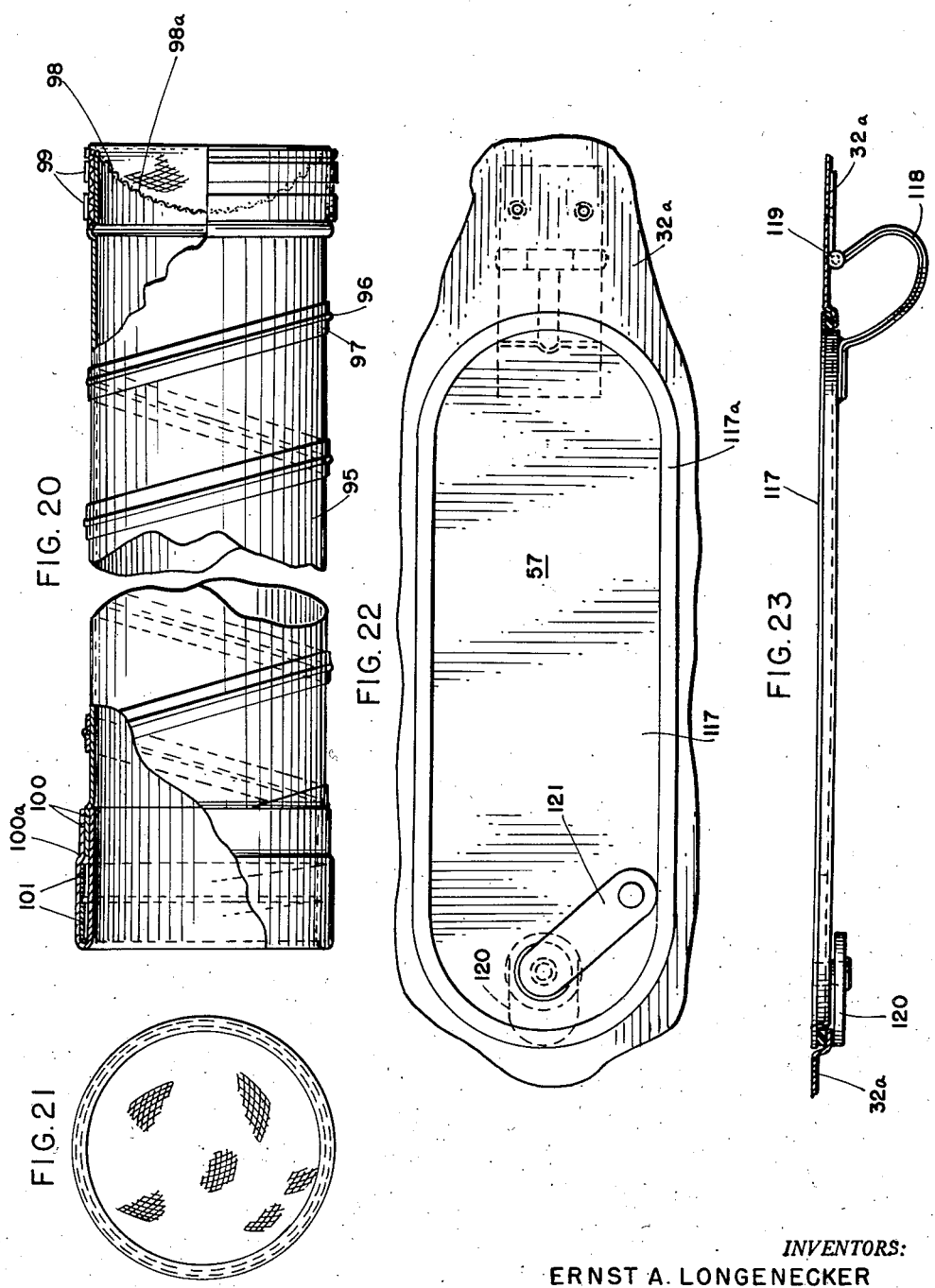

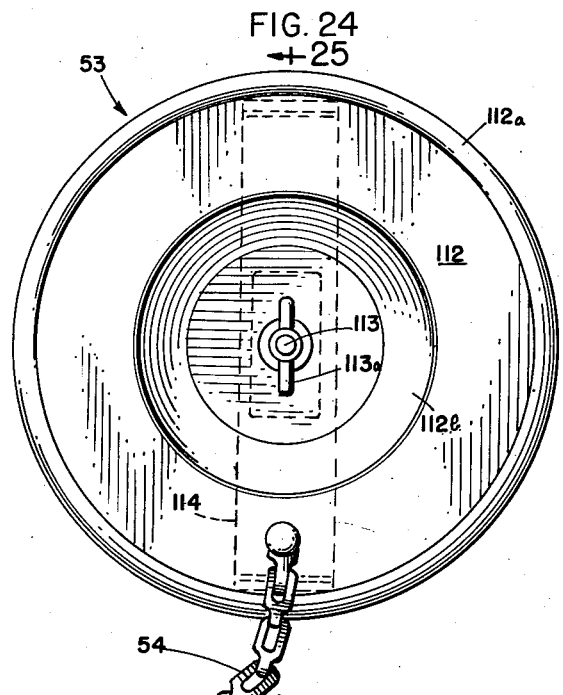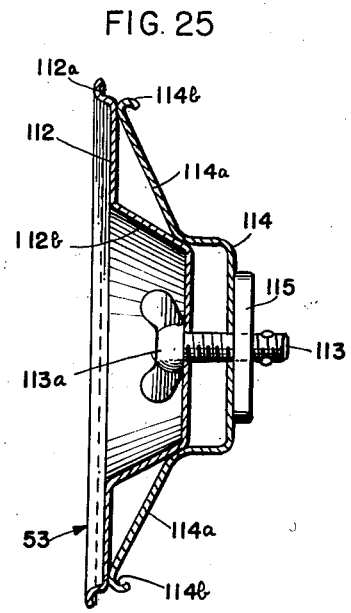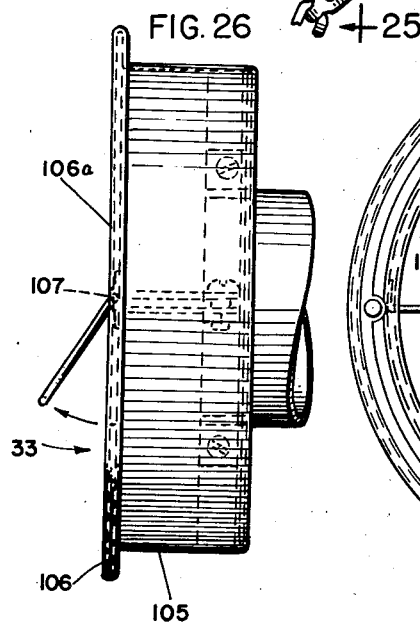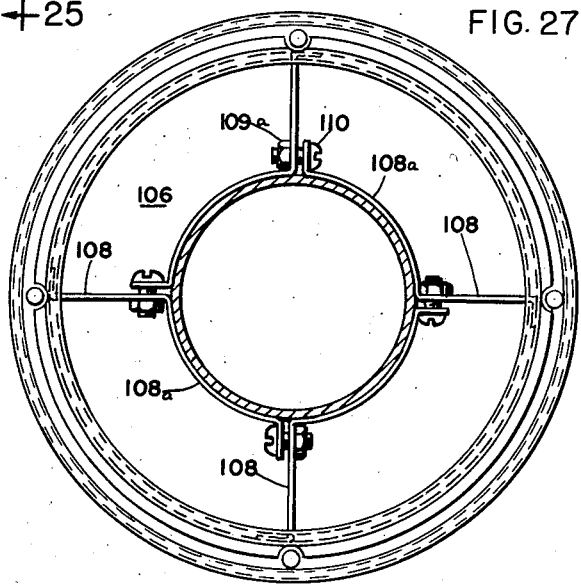

United States Patent Office 2,796,143
Patented June 18, 1957

2,796,143
AIR PURIFIER

Ernst A. Longenecker, Wauwatosa, and Edward S. Hanson, Jr., Racine, Wis., assignors to Jacobsen Manufacturing Company, Racine, Wis., a corporation of Wisconsin Application August 8, 1952, Serial No. 303,372

10 Claims. (Cl. 183—4.8)

This invention relates to improvements in air purifiers of the type commonly known as collective protectors which are employed for purifying the air in enclosures occupied normally by a number of persons who would be required to wear gas masks if the protector were not used. This collective purifier thus lends itself to military uses and may be employed to purify the air in enclosed areas which are filled or surrounded by air which has been contaminated by poisonous fumes and gases arising from explosions or from other sources.

Air purifiers of the collective type have heretofore been of a heavy and bulky construction so that they could not be readily and promptly transported to the places where their use was often urgently required. Further, these prior devices have generally been of such designs that they have been very costly to manufacture and expensive to maintain.

The principal object of the present invention is to provide a relatively small and compact portable collective air purifier of light weight which is capable of being manufactured and maintained at relatively small cost and which has a high air purifying capacity. A further object of the invention is to provide a collective air purifier which may be readily assembled and disassembled and in which the air purifying units may readily be replaced. Another object of the invention is to provide a collective air purifier comprising improved means for storing in small space the flexible hoses through which impure air is drawn into the device and purified air discharged therefrom. Still another object of the invention is to provide improved means by which a motor driven fan may be caused to blow the impure air through the purifying units or to draw it through those units by suction, thus rendering the device suitable for use either outside of or within the enclosure in which purified air is desired. Other objects relate to various features of construction and arrangement which will appear more fully hereinafter.

The nature of the invention will be understood from the following specification taken with the accompanying drawings in which one complete embodiment of the invention and modified forms of certain parts thereof are illustrated. In the drawings, Figure 1 shows a perspective view of the improved purifier of the present invention located outside of a building structure and connected for purifying the air and blowing it into the interior space of the building, the purifier being shown on a magnified scale in comparison with the scale of the building;

Fig. 2 shows a perspective view of the air purifier illustrated in Fig. 1 with the end plate of the casing or canister removed and the purifying units withdrawn from the casing;

Fig. 3 shows the improved air purifier with the engine or motor removed and with the retractible handles withdrawn to a position occupied during transportation of the device;

Fig. 4 shows a top plan view of the improved purifier with the engine in place on the casing as in Figs. 1 and 2;

Fig. 5 shows a side elevation of the improved purifier with parts broken away and other parts shown in vertical section;

Fig. 6 shows an end elevation of the improved purifier, looking toward the left as viewed in Fig. 5, with parts thereof broken away and other parts shown in vertical section;

Fig. 7 shows a perspective view of the preferred form of purifying unit embodied in the improved collective purifier with parts thereof broken away to reveal the internal purifying cell structure;

Fig. 8 shows a partial vertical section through the end portion of the filter paper purifying cell shown in Fig. 7 with a vertical section through adjacent parts of the unit;

Fig. 9 is a horizontal section through a corner portion of the housing of the purifying unit, showing one method of forming a tight connection between the side and end walls;

Fig. 10 is a sectional view similar to that of Fig. 9, showing a modified form of this construction;

Fig. 11 shows a vertical section through one end of a modified form of one of the charcoal purifying cells shown in Fig. 7;

Fig. 11a is a sectional view through one of the filter paper cells shown in Fig. 7, illustrating the means for spacing the convolutions of the cell;

Fig. 12 shows a side elevation of a modified form of purifying unit having a housing and associated parts formed of metal, parts of the structure being broken away and other parts being shown in vertical section;

Fig. 13 shows a perspective view of the purifying unit shown in Fig. 12;

Fig. 14 shows a partial end elevation of any of the purifying units, illustrating end views of the nonmetallic bumper plates which are attached to the sides of the unit;

Fig. 15 is a perspective view of the casing or canister of the collective purifier with parts thereof broken away, illustrating the paths of the air currents through the casing as they travel when the purifying units and all other parts of the apparatus are assembled;

Fig. 16 shows a top plan view of the form of charcoal purifying cell embodied in the form of purifying unit shown in Figs. 12 and 13;

Fig. 17 is an end elevation of the cell shown in Fig. 16, with parts thereof in section to show the connection between the outer rectangular wall or shell and the rims which overlap the perforated plates forming the top and bottom walls of the cell;

Fig. 18 is an enlarged sectional view of a portion of the charcoal purifying cell illustrated in Fig. 17;

Fig. 19 shows a sectional view similar to that of Fig. 18 showing another modified form of connection between the rims and the shell;

Fig. 20 shows a side elevation of one of the flexible hoses through which air is drawn into or discharged from the casing or canister of the purifier, with parts thereof broken away and other parts shown in section;

Fig. 21 shows an end view of the hose, looking toward the right as viewed in Fig. 20;

Fig. 22 shows an enlarged top plan view of the cover for a tool box which is mounted in the casing or canister between the positions which are occupied at different times by the fan;

Fig. 23 shows a side elevation of the cover illustrated in Fig. 22;

Fig. 24 shows an end elevation of one of the caps for closing a hose receptacle in the casing or canister;

Fig. 25 shows a vertical section taken on the line 25—25 of Fig. 24;

Fig. 26 shows a side elevation of the intake cap which is mounted at the intake end of the intake hose; and Fig. 27 shows a bottom plan view of the intake cap shown in Fig. 26.

As shown in Fig. 1 of the accompanying drawings a collective purifier 30 embodying the features of the present invention is shown in use outside of the building for supplying purified air to the interior of the building. As shown, the purifier 30 which is greatly magnified in size in comparison with the size of the building, is shown resting upon the ground and provided with a flexible inlet hose 31 communicating with the interior of the casing or canister 32 in which most of the parts of the apparatus are located. The tube 31 is provided at its outer end with an inlet cap 33 which is suspended on a branch of a tree 39. The air enters the cap 33 through its underside and is drawn through the tube 31 into the interior of the casing 32 by a fan which is power driven by a motor 34, preferably an internal combustion engine operated by gasoline or the like which is supplied thereto from a tank 35 and the exhaust of which is exhausted through a flexible tube 35a. The purifier 30 is also provided with a flexible outlet hose 36 through which the purified air is discharged through a window 37 into the interior of the building 38 to which purified air is to be supplied by the operation of the apparatus.

The casing 32 has a top wall 32a, end walls 32b, and side walls 32c as well as a bottom wall which connects the lower edges of the side walls. One end wall 32b is provided with a rectangular opening which is normally closed by a cover plate 40 secured to the end wall by a series of screws 41 or, for example, by a plurality of quick-acting clamps of a type (not shown) which will permit an operator to remove the cover plate and gain access to the contents of the casing for replacement thereof in a minimum of time without the use of tools and, if desired, while wearing protective mittens or the like. When this cover plate is removed, access may be had to the interior chamber of the casing 32 in which there are located a plurality of purifying units 42 which are preferably of the form shown in Figs. 2, 5 and 7. These purifying units are adapted to slide into the interior chamber of the casing or canister 32 on rails 43 which may be in the form of perforated U-shaped members arranged to support the purifying units and to permit air to circulate to and from the region beneath these units. Each purifying unit 42 is provided on its opposite faces with buffer plates 44, formed of sponge rubber or the like, and this buffer plate on the inner side of the innermost unit abuts against the division wall 45 which extends vertically in spaced relation to the adjacent end wall 32b, as shown particularly in Figs. 5 and 15. The buffer plates or gaskets 44 on the ends of the two purifying units which are adjacent to each other abut against each other and the buffer plate on the outer end of the outermost unit is engaged by an inwardly bent portion of the cover plate 40. The purifying units 42 are held against relative endwise movement on their supporting tracks 43 by tie rods 48 which extend through apertures in the end wall 32b which is farther from the cover plate 40, through the purifying units 42 and through apertures which are formed in the cover 40. These tie rods are threaded on their ends which extend through the cover plate 40 and are engaged by wing nuts 49. The buffer plates 44 are provided with elongated slots 44a communicating with an interior space in each of the purifying units, hereinafter described, and the tie rods 48 extend through these openings 44a or through central openings which are formed in the middle portions of the buffer plates 44 to accommodate the metal tie rod. When the filter units 42 have been inserted in the casing 32, the cover plate 40 is then applied by means of the screws 41, as shown in Fig. 5, and the tie rods 48 and their nuts 49 are then put in place to hold the associated parts in assembled relationship.

The filter units 42 have a perforated plate 50 extending horizontally above them and the perforations in this plate may be so arranged as to size and distribution that they will properly control the flow of air through the filter units. This perforated plate 50 is supported from the side walls 32c of the casing by means of brackets 51 and these brackets are arranged to project over and in proximity to the top edges of the filter units 42 so that these units will be supported against movement in the event that the entire purifier be turned upside down.

The construction of the casing or canister 32 is perhaps best illustrated in Figs. 1, 2, 3, 4, 5, 6 and 15 where it is shown as comprising two tubes 52, each adapted to receive and form a connection with one of the flexible hoses 31 and 36. Each tube 52 is closed at one end by an end wall 32b of the casing but it is open at the other end to receive one of the hoses and these hoses are adapted to be compressed and telescoped within the tubes when they are not in use, so that they are protected from the weather. When so mounted within the tubes, the open ends of the tubes are adapted to be closed by detachable cap members 53 which may be removed and suspended from the casing by chains 54 when the hoses are in use as shown in Fig. 1.

The tubes 52 are each provided toward one end with elongated openings 52a located on their inner sides for communication with the air chambers which are located between the top wall of the casing and a horizontal division wall 55 which extends from one end wall of the casing to the upright wall 45 previously referred to. The division wall 55 extends throughout the space between the tubes 52 and is provided toward its ends with circular openings 55a, shown particularly in Figs. 5 and 15. The space above the division wall 55 is divided into two chambers by a tool box 56 having sheet metal walls which extend downwardly from the top wall of the casing with flanges 56a thereof secured to the wall 55. Above the tool box, the top wall 32a of the casing is provided with an elongated opening 32d which is normally closed by the tool box cover 57.

The top wall of the casing 32 is provided directly above each of the openings 55a with a circular opening 32e and the engine 34 is provided with a frame having a circular base flange 34a which is adapted to seat upon the top wall 32a of the casing over either one of the openings 32e. This base flange is secured in position by studs 58 extending through it and engaging threaded apertures in a clamping ring 59 located on the underside of the top wall 32a around the opening. The vertical rotary shaft 34b of the engine has secured thereon a fan 60 which extends downwardly with its lower margin located around the upturned flange 55b at the edge of one of the openings 55a. With this arrangement, the operation of the fan 60 by the engine 34 serves to cause air to be propelled from the chamber 61, as shown in Fig. 5, through one of the passages 52a into one of the tubes 52 from which the air is forced outwardly through that tube and through the connected outlet hose 36.

When the engine 34 is located with the fan 60 in the chamber 61, the other opening 32e in the top wall of the casing is closed by a cover plate 62 secured in place by screws 63 and with the fan in that position the air is drawn by suction through the filter units 42 and is then blown out directly by the fan through the discharge tube. If it be desired to blow the air through the filter units, instead of drawing it through these units by suction, the engine 34 is placed over the other opening 32e, after removing the cover plate 62, and this cover plate is then placed over the opening 32e which is directly above the chamber 61. The fan 60 will then be located in the chamber 64 around the other opening 55a formed in the plate 55 and the air coming in from the inlet hose 31 through the connected tube 52 will pass through the openings 52a in that tube and thence through a manifold 65, shown particularly in Fig. 15, from which the air passes upwardly through the opening 55a and through the fan, being then blown downwardly through the passage between the division wall 45 and the adjacent end wall 32b of the casing. The air then passes through the openings 45a formed in this division wall and, after circulating through the purifying units, moves upwardly through the opening 55a at the bottom of the chamber 61 and is discharged into the outlet tube 52 which communicates with the discharge hose 36. This circulation of the air through the passages of the casing 32 is best illustrated by the arrows in Fig. 15.

One preferred form of purifying unit 42 is that which is shown particularly in Figs. 2 and 7. It comprises a rectangular box-like structure having end walls 70 and side walls 71 secured together at their meeting points and open on their upper and lower sides, thus forming a rectangular enclosure in which are mounted two purifying cells 72 containing charcoal or other suitable reducing and purifying agent and two particulate filtering cells 73. One charcoal cell and one filtering cell are located above an intermediate plenum chamber or air cell 74 and one charcoal cell 72 and one particulate filtering cell 73 are mounted beneath the air cell. The walls 70 and 71 of the purifying unit may be formed of wood and also the side walls 72a and the end walls 72b of the charcoal cells, or all the walls of each unit and the cells therein may be formed of metal, as illustrated in Figs. 12, 13, 16, 17 and 18. Flat sheets of filter paper 75a covered by perforated plates 75 of metal or fiberboard are secured to the top and bottom edges of the walls 72a and 72b of each charcoal cell, as seen in Figs. 7 and 11, thus forming an inner enclosure in which the granulated charcoal 76 or other purifying compound is located.

The intermediate air cell 74 has side walls 74a and end walls 74b which are formed preferably of wood with their ends secured together at the corners of the cell and the side walls 74a are provided with elongated slots 74c which are of the same size and formation as the openings 44a formed in the buffer plates or gaskets 44 and the corresponding openings 71a formed in the sides of the walls of the unit. Passages are thus provided through which air can pass to the region within the air cell 74 which is open on its upper and lower sides for communication with the filter units 73. The air cell is located in the middle of the unit with one charcoal cell and one particulate filter cell above it and also below it so that it is immaterial which charcoal cell is on top when the unit is placed in the casing 32, thereby facilitating the insertion and removal of the prefabricated units.

The outer walls of the cells are connected to the surrounding walls 70 and 71 of the shell by paint or other sealing material so that an air-tight seal is provided and the air is compelled to pass through the cells. When the outer walls of the cells and the unit are formed of wood and the perforated plates 75 are formed of fiberboard, the entire unit may be readily disposed of by incineration when it is replaced.

The particulate filter units are made up of convolutions 73a of filter paper which extend in zigzag fashion throughout the length of the purifying unit between the air cell 74 and one of the charcoal cells 72. In order to maintain the convolutions 73a of the filtering unit separated from each other, spacing units made up of strips of cardboard, chip board or fiber 73b, folded in zigzag fashion, are mounted between each pair of adjacent convolutions of the filter paper 73 with their folds extending vertically, as shown particularly in Fig. 11a.

In Fig. 8 there is shown in detail one end portion of the filter unit 73. As there illustrated in part, the endmost convolutions of the filter paper are cemented or otherwise secured to wooden members 77 which comprise the opposite ends of a rectangular frame having side walls 77a and surrounding the cell. The walls of the frame are secured by screws 78 to the walls 70 and 71 of the outer shell of the unit. In the embodiment shown, the ends of the filter paper are cemented to the ends 77 of the frame, as at 79, and the sides of the filter paper convolutions are heavily cemented to the sides 77a of the frame, as at 79a (Fig. 7). The frame is also preferably cemented to the insides of the walls 70 and 71 of the outer shell as shown at 79b (Fig. 8). The cemented joints 79, 79a and 79b insure against leakage of air around the filter paper.

In Fig. 9 there is shown one method of forming an air-tight joint between the end wall 70 and the side wall 71 of the outer shell of the purifying unit 42, according to which the end wall is provided with a projection 70b engaging a recess or groove 71b formed in the side wall, and the parts are then secured together by nails 80. In Fig. 10 there is shown another method of forming a substantially air-tight connection between the walls of the outer shell according to which a groove is formed in the end wall 70 to receive a quantity of cement 81 contacting with the adjacent side wall 71 and nails 83 and then driven through the side wall 71 into the end wall 70.

Among the constructions which may be used to prevent the circulation of unfiltered air between the edges of the charcoal body and the frame enclosing the charcoal are, perforated plates 75 having blank margins, or having their marginal holes blocked off by a sealing material a suitable distance inwardly from their edges, and the provision of inwardly extending projections on the inner walls of the frame extending into the body of the charcoal to give the effect of a labyrinth seal. Both of these provisions are illustrated in combination in Fig. 11 where the margins of the perforated plates 75 are shown as being blank and the walls of the frame around the charcoal body are provided with projections 72c extending into the charcoal to prevent passage of air around the edges of the charcoal body. As shown in Fig. 11, the perforated plates 75 and the filter paper 75a thereunder are secured to the outermost projection by screws 84 or the like. The end walls 72b and the side walls 72a of the charcoal cells are provided with grooves 72d adapted to be filled with suitable sealing material, as at 72e, to form air-tight joints to prevent leakage of air around the margins of the frames of the charcoal cells.

A modified form of charcoal cell 85 having its walls formed of sheet metal is shown in Figs. 16, 17 and 18 where it is illustrated as comprising an outer rectangular wall or shell 86 having located within the upper and lower margins thereof perforated rectangular plates 87 formed of sheet metal, fiberboard or the like, which fit within the shell 86 over sheets of filter paper 87a and are overlapped around their marginal edges by the inwardly extending flange 88a of a rectangular rim 88. This rim is a continuous rim of rectangular shape and it is provided on its upper side adjacent its inner margin with an upstanding rib 88b which gives it stiffness and causes it to maintain its position in contact with the perforated plate 87. The space between the two perforated plates 87 is filled by granular charcoal 89, and the flanges 88a, in addition to holding the plates 87 in position, also serve to block off the marginal holes of these plates, thus preventing circulation of unfiltered air between the edge of the charcoal body and the inside of the shell 86. As shown particularly in Fig. 18, the edges of the outer shell 86 are reversely bent as shown at 86a and these reversely bent parts interlock with the flanges 88c of the rim 88 which extend around the reversely bent edges of the shell 86 and terminate in vertically directed flanges 88d lying between the body portion of the shell 86 and the reversely bent flanges 86a thereof. In Fig. 19 there is shown a modified construction of the metal members which are embodied in the form of charcoal cell illustrated in Figs. 16, 17 and 18. In Fig. 19 the outer metal shell 90 of rectangular form is provided with upper and lower marginal edges 90a which are flared outwardly and these outwardly flared portions interlock with reversely bent flanges 91a which are formed on the rectangular rim 19 extending about both the upper and the lower margins of the shell and overlapping the two perforated plates 92 of sheet metal, fiberboard or the like, which contain between them sheets of filter paper 92a and the body of granular charcoal 93.

In Figs. 12 and 13 there is shown a modified form of purifying unit 42 comprising a metal shell having side and end walls 71 and 72, respectively, and containing charcoal cells 85 and particulate or paper filter cells 73 having metal frames of the kind illustrated in Figs. 16 to 19. In this modification, leakage between and around the individual cells is prevented by gaskets 130 or by other sealing material disposed between adjacent cells and in sealing contact with the inner walls of the shell. It will be noted, however, that in the form of purifying unit illustrated in Fig. 7, no gaskets are employed within the unit per se and the only gaskets used are the non-weight-bearing buffer plates or gaskets 44 which are disposed between adjacent units.

The flexible hoses 31 and 36 which are illustrated in Fig. 1 may have the detailed construction which is shown particularly in Figs. 20 and 21 where the hose has a tubular member 95 formed preferably of rubberized fabric or the like which is surrounded by a helical metal spring 96 arranged preferably with a helical winding 97 of rubberized fabric between its convolutions and the fabric tube 95. At the discharge end of the flexible hose 36 through which the purified air flows, the tube 95 is secured to the outside of a metal ring 98 by means of a plurality of clamping bands 99. Secured to the ring 98 there is a discharge screen 98a through which the air flows as it is discharged by the action of the engine 34. At the other end of the tube 95, as shown in Fig. 20, the fabric tube 95 terminates within a doubled-over sleeve 100 formed of felt or the like sewed or cemented to the end of the tube 95 and having mounted within it two turns of a sheet metal spring 101 of substantial thickness and of helical form so that it expands to press the felt outwardly against the inside of one of the tubes 52 and thus provide a tight telescoping seal between the inner end of the hose and the tube 52. The hose is adapted to be collapsed longitudinally by compression of the helical spring 96 and folding of the fabric tube 95 so that the entire tube, several feet in length, may be compressed within the connected tube 52 and then held in place within the casing by the cap 53. When the cap 53 is removed and the hose drawn outwardly, the shoulder 100a provided by an edge of the spring 101 engages a shoulder in the mouth of the tube 52 to limit the withdrawal of the tube.

The hose 31 which is connected to the inlet side of the apparatus is provided with the inlet cap 33 previously referred to and illustrated in greater detail in Figs. 26 and 27. This inlet cap comprises an outer cylindrical shell 105 connected to a top wall 106 provided with a depression 106a in which there is located a wire hook 107 pivotally attached to the top wall and adapted to be moved upwardly when desired for connection with a support as, for example, the branch of the tree illustrated in Fig. 1. Adjacent its lower edge, the cylindrical shell 105 has secured thereto a number of sheet metal arms 108 extending radially inward and terminating in arcuate portions 108a which are adapted to extend around the inlet end of the hose 31 which is provided with an annular collar 98 as shown in Fig. 20. The inlet cap 33 may thus be clamped to the inlet end of the hose by tightening the nuts 109 upon the bolts 110 which engage the arms 108 and radial flanges at the ends of the arcuate portions 108a. With this arrangement, the air passes upwardly through the spaces between the arms 108 and thence into the mouth of the hose 31 so that moisture does not enter.

The previously mentioned cap member 53 for closing the ends of the tubes 52 when the hoses 31 and 36 are telescoped within the casing 32 is shown in detail in Figs. 24 and 25 where it is illustrated as comprising a circular sheet metal plate 112 having an upwardly and outwardly turned flange 112a around its outer margin, having a central depressed portion 112b which is engaged by a screw 113 having a head 113a adapted to be manipulated by the fingers of the operator. The screw extends through a spring plate 114 having outwardly diverging arms 114a terminating in reversely bent beads 114b. The screw 113 engages a threaded member 115 on the inner side of the central portion of the spring member 114 and, after the body portion 112 of the cap member has been inserted into the mouth of the tube 52, with the flange 112a overlapping the edge of that mouth, the screw 113 may be manipulated to cause the arms 114a of the spring to spread outwardly and interlock with the end of the tube 52 to hold the cap member securely in place. The previously described chain 54 by which the cap member 53 is attached to the casing 32 is connected to the margin of the plate 112, as shown in Fig. 24.

The cover 57 for the tool box 56 which forms a partition between the chambers 61 and 64, as shown particularly in Fig. 5, is illustrated in greater detail in Figs. 22 and 23. It comprises a metal plate 117 having a marginal flange 117a adapted to overlap the edges of the aperture 32d formed in the top wall 32a of the casing. This cover is provided at one end with a flexible hinge 118 secured at 119 to the top wall 32a and at its other end, the cover 57 carries a pivoted latch member 120 adapted to underlie the edge of the top wall 32a. This latch member is adapted to be rotated by means of a handle 121.

The air purifying apparatus of the present invention, although relatively small and compact, is ordinarily too heavy to be readily transported by one person and provision has therefore been made for withdrawing two pairs of handles from their retracted positions in the casing 32 so that two men may carry the apparatus readily. As shown particularly in Figs. 3, 5 and 6, these handles are in the forms of rods 125 which are normally in retracted position within the casing 32 but are capable of being withdrawn as shown in Fig. 3. Two of these rods 125 are provided at each end of the casing 32 and they are mounted to slide in pipes 126 which extend lengthwise through the casing slightly below and outwardly from the tubes 52, the ends of these pipes being secured in the end walls 32b of the casing. In order to limit the extent to which the handles 125 may be withdrawn, each handle is provided at its inner end with a wire loop 127 which is engaged by a screw 128 mounted in the side wall of the casing 32 so that when the connected rod 125 is withdrawn, the screw 128 engages the end of the loop 127 and thus limits the extent of the withdrawal as illustrated in Fig. 5. One of the parallel arms of each wire loop 127 is provided with a hump 127a which is adapted to spring over the neck of the screw 128 when the rod 125 is thrust inwardly to the normal retracted position shown in Figs. 2 and 6, thus preventing accidental withdrawal of the rod.

When it is desired to ship the purifying apparatus, the motor 34 is normally removed from the casing, as shown in Fig. 3, and the opening 32e, above which the motor or engine was previously mounted, is covered during transportation by the detached inlet cap 33 which is of the same size as the circular plate 62 and the engine or motor which has been removed is then shipped separately.

It has been pointed out above that with the engine 34 mounted upon the casing 32 in the position shown in the drawings and with the fan 60 located in the chamber 61, the air will be pulled through the filter units 42, and that the air, on the other hand, will be blown through the units 42 when the fan is located in the chamber 64 (Fig. 5) with the engine mounted over that opening 32e which is shown in the drawings as being covered with the cover 62 (Figs. 1 and 4). In each instance, however, the general path followed by the air is the same. The air enters the flexible inlet tube 31 and passes through the metal tube 52 to which the inlet tube 31 is attached, and thence through the manifold 65 and upwardly into the chamber 64 through the opening 55a in the plate 55 (Figs. 5 and 15). From this chamber the air passes downwardly, in the direction shown by the arrow in Fig. 15, into the space between the upstanding division wall 45 and the adjacent end wall 32b of the outer casing 32. From this space the air moves freely through the openings 45a in the wall 45, into the intermediate plenum chambers or air cells 74 of the two side-by-side purifying units 42, these two plenum chambers or air cells being interconnected through the aligned slots 74c in the side walls of their frames 74 and through the aligned openings 71a and 44a in the outer walls of the purifying units and the intervening gaskets 44, respectively. The side openings 74c next adjacent the cover plate 40, at the front of the casing 32, are sealed by a recessed or dished portion 40a of the cover plate which abuts and is pulled tightly against the endmost rubber gasket 44 by the tie rods 48 (Fig. 5) which, as previously mentioned, also hold the purifying units 42 against endwise movement and cause the units to be drawn firmly to the left as viewed in Fig. 5. This causes the gaskets 44 between the purifying units 42 to be drawn together in gas-tight engagement and causes the gasket 44 next to the division wall 45 to be drawn tightly against that wall around the openings 45a therein. It will thus be understood that all air that passes through the openings 45a in the wall 45 enters the two plenum chambers or air cells 74 and that, upon leaving the air cells 74, the air must pass either upwardly or downwardly through the upper or lower particulate filter cells 73 and the purifying cells 72 of the units 42.

The perforated rails 43 (Fig. 15) which support the purification units 42 are spaced inwardly from the side walls 32c of the outer casing 32 and, as best seen in Fig. 6, there are spaces between the bottom and side walls of the casing 32 and the bottoms and adjacent walls of the purification units 42. The wall of the unit 42 next adjacent the upstanding division wall 45 is also spaced therefrom by the gasket 44, and a similar space exists between the front wall 32b of the outer casing 32 and the adjacent wall of the forwardmost unit 42. The marginal edges of the perforated air flow control plate 50, which is located horizontally above the purifying units 42, are similarly spaced inwardly from the adjacent walls of the casing 32. As a result, a portion of the air that enters the plenum chambers or air cells 74 passes downwardly through the lower particulate filters 73 and purifying cells 72 of the units 42, and the remainder of the air passes upwardly through the identical upper filters and cells of the units 42. The air passing downwardly emerges from the bottoms of the purifying units 42 and then moves upwardly alongside the outer walls of the units, past the marginal edges of the perforated plate 50, and thence through the opening 55a in the plate 55 and into the chamber 61 from which it is discharged through the other tube 52 and the outlet hose 36. The air emerging from the tops of the purifying units 42, on the other hand, must pass through the perforated plate 50 as it moves toward the opening 55a leading into the chamber 61. The openings in the perforated plate 50 vary in size and dispersion and are so arranged as to apply to the upwardly moving air the same total resistance that is encountered by that portion of the air which emerges from the bottoms of the purification units 42. As a result approximately one-half of the air entering the plenum chambers or air cells 74 moves downwardly through the lower filters 73 and cells 72 and the other half moves upwardly through the corresponding upper cells of the units 42, causing all the upper and lower filters and cells in the units 42 to do the same amount of work in the purification of the air. The variations in the perforations in the plate 50 are also such that portion of the air moving upwardly through the purifying units 42 emerges from all parts of the tops of the units at substantially the same rate.

To this end, that portion of the plate 50 directly beneath the opening 55a leading into the chamber is more dense than the more remote portions of the plate, the density of the plate being varied, as pointed out earlier herein, either by providing perforations of different sizes in the plate or by varying the distances between the perforations. The particular sizes and distribution of the perforations that are employed in the plate 50 will, of course, vary with such factors as the size, number and structural details of the purifying units 42, the particular materials used in the filter units 73 and purifying cells 72 of the units 42, and with structural details of the interior of the casing 32, but with these factors known in any given case, the detailed design of the plate 50 is well within the ability of those skilled in the art.

From the foregoing description it will be apparent that applicants have provided an improved and simplified form of air purifier which is compact in form and which comprises a plurality of prefabricated interchangeable air purifying units which are reversible and may be readily removed and replaced so that the apparatus may be maintained in continuous operation without any excessive difficulty or expense in the removal and replacement of parts.

Although one embodiment of the invention and modified forms of certain features thereof have been illustrated and described, it will be understood that the invention may be constructed in various other forms without departing from the scope of the appended claims.

We claim:

1. The combination in air purifying apparatus, of a casing having a purifying chamber, purifying cells mounted in said chamber, air tubes having communication with said chamber, said casing having a pair of openings in its wall, an engine, means for mounting said engine over a selected one of said openings, a fan carried and driven by said engine and located in said casing for causing air to flow through said tubes and said cells, and a cover for the other opening.

2. The combination in air purifying apparatus of a casing having a purifying chamber, air purifying cells in said chamber, a tube mounted within said casing and communicating with said chamber, a flexible hose connected to said tube, and means for causing the flow of air in said chamber and in said tube and said hose, said hose being flexible and being retractile into said tube.

3. The combination in air purifying apparatus, of a casing having a purifying chamber, air purifying cells in said chamber, a tube mounted within said casing and communicating with said chamber, a flexible hose connected to said tube, means for causing the flow of air in said chamber and in said tube and said hose, said hose being flexible and being retractile into said tube, and a detachable cap for retaining said hose in its retracted position in said tube.

4. The combination in air purifying apparatus, of a casing having a purifying chamber, air purifying cells in said chamber, a pair of tubes carried by said casing, each of said tubes being open at one end, a pair of flexible hoses each having connection with the open end of one of said tubes, and means for drawing air into said chamber through one of said hoses and its connected tube and for discharging said air from said chamber through the other tube and the other hose, said hoses being much longer than said tubes and being collapsible endwise into said tubes.

5. The combination in air purifying apparatus, of a casing having a purifying chamber, air purifying cells in said chamber, means for conveying air to and from said chamber, a plurality of rods slidably mounted in said casing and adapted to be withdrawn to serve as handles for said apparatus, a stop member spaced inwardly from the inner end of each of said rods, and a loop member secured to and extending inwardly from the inner end of each of said rods, each of said loop members being looped about one of said stop members and extending therebeyond when said rod is in retracted position, engagement of said loop with said stop member limiting withdrawing movement of each of said rods, said loop members each having a projecting portion yieldingly engaging said stop member when said rod is in retracted position to prevent accidental withdrawal of said rod.

6. A prefabricated purifying unit for air purifying apparatus comprising, an outer shell of generally rectangular configuration open at its top and bottom, and a plurality of purifying cells also open at their top and bottom fitting within said shell and having their edge portions secured to said shell in an air-tight manner, said cells comprising absorption cells and filter cells arranged alternately in superimposed relation and an air cell interposed between said absorption and filter cells and having air openings in opposite sides thereof, said shell having air openings registering with said openings in said air cell, and said filter cells each including a sheet of filter paper folded in zigzag fashion in the path of said air.

7. The combination in air purifying apparatus, of a casing having a purifying chamber, air purifying cells in said chamber, a tube mounted within said casing and communicating with said chamber, a flexible hose connected to said tube, means for causing the flow of air in said chamber and in said tube and said hose, said hose being flexible and being retractile into said tube, and means for causing said hose to expand into fluid tight engagement with said tube.

8. The combination in air purifying apparatus, of a casing having a purifying chamber and also having an inlet chamber and an outlet chamber separate from each other but communicating with said purifying chamber, purifying cells mounted in said purifying chamber, an air tube having communication with said inlet chamber, an air tube having communication with said outlet chamber, a motor and fan unit for circulating air through said tubes and through said cells in said purifying chamber, and a plurality of mounting means on said casing for selectively mounting said unit, the mounting of said unit on one of said mounting means placing said fan in said inlet chamber to blow air through said cells and the mounting of said unit on the other of said mounting means placing said fan in said outlet chamber to draw air through said cells by suction.

9. The air purifying apparatus of claim 8 in which said motor is located outside said casing and said fan is located within casing when said unit is mounted on either of said mounting means.

10. The combination in air purifying apparatus, of a casing having a purifying chamber, a purifying unit mounted in said chamber and comprising, an air cell open both top and bottom a plurality of superimposed purifying cells open top and bottom and located on both sides of said air cell, means for circulating air through said air cell and said purifying cells on both sides of said air cell, a plate mounted in said chamber above said unit and having perforations of various sizes therein for controlling the flow of air through said purifying cells above said air cell, and spaced rails mounted on the bottom wall of said casing for supporting said unit, said rails being provided with outlet openings for the air flowing from said purifying cells below said air cell to the space between said rails, said perforations and said openings being dimensioned so that substantially the same amount of air flows from said air cell through said purifying cells on both sides of said air cell.

References Cited in the file of this patent

UNITED STATES PATENTS

| | | |
|---|---|---|
| 764,922 | Davis | July 12, 1904 |
| 1,439,151 | Dailey et al. | Dec. 19, 1922 |
| 1,535,819 | Emmet | Apr. 28, 1925 |
| 1,811,279 | Quarnstiom | June 23, 1931 |
| 1,950,502 | Madan | Mar. 13, 1934 |
| 2,301,529 | Fagan | Nov. 10, 1942 |
| 2,394,923 | Little | Feb. 12, 1946 |
| 2,421,705 | Kasten | June 3, 1947 |
| 2,430,861 | Carpenter | Nov. 18, 1947 |
| 2,444,809 | Cranmer | July 6, 1948 |
| 2,511,497 | Dauphinee | June 13, 1950 |

FOREIGN PATENTS

| | | |
|---|---|---|
| 238,135 | Great Britain | Aug. 13, 1925 |
| 295,070 | Great Britain | Aug. 9, 1928 |
| 485,568 | Great Britain | May 17, 1938 |
| 494,880 | Great Britain | Nov. 2, 1938 |
| 510,985 | Great Britain | Aug. 11, 1939 |
| 46,219 | France | Apr. 2, 1936 |
| | (2nd addition to 766,129) | |
| 932,776 | France | Apr. 1, 1948 |
| 372,900 | Italy | July 13, 1939 |